K. M. KOOPMANN.
COOKING POT COVER.
APPLICATION FILED FEB. 12, 1916.
1,210,813.
Patented Jan. 2, 1917.
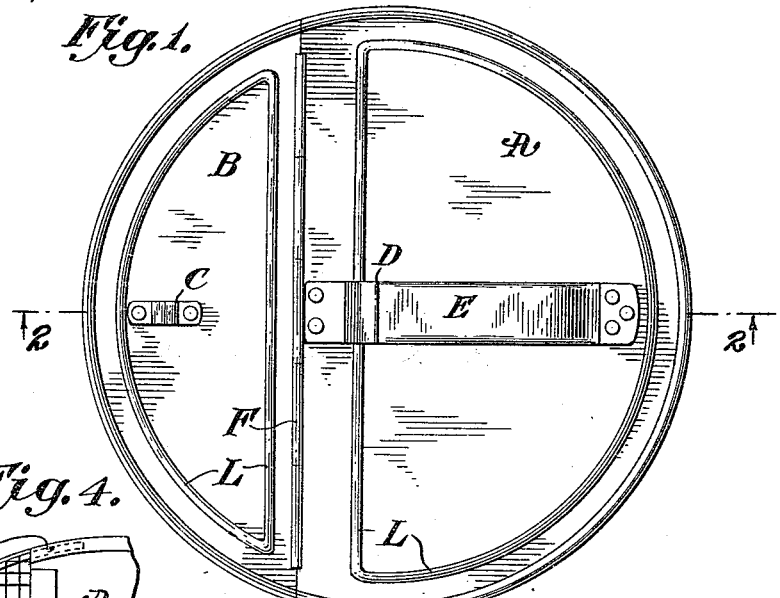
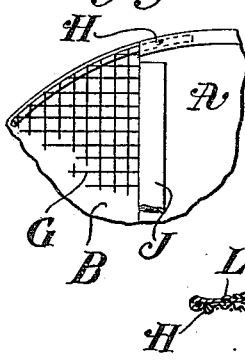
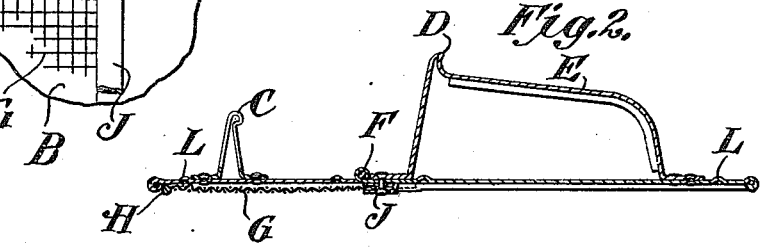
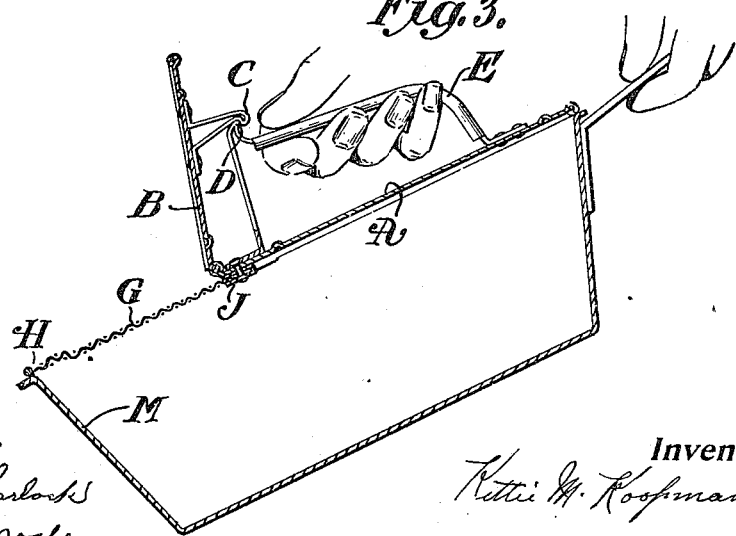
Attest:
Inventor:

UNITED STATES PATENT OFFICE.

KITTIE M. KOOPMANN, OF WALDWICK, NEW JERSEY.

COOKING-POT COVER.

1,210,813.                    Specification of Letters Patent.    Patented Jan. 2, 1917.

Application filed February 12, 1916. Serial No. 77,919.

*To all whom it may concern:*

Be it known that I, KITTIE M. KOOPMANN, a citizen of the United States, residing at Waldwick, county of Bergen, and State of New Jersey, have invented a new and useful Cooking-Pot Cover, of which the following is a specification.

My invention relates to the means used to cover cooking utensils while contents of pot are being boiled or cooked in water or some other fluid and to allow the pouring out of such cooking pot by hand, the hot water or other fluid, without scalding the hands in the operation and at same time retain in the pot the remainder of its contents, thereby preventing what would otherwise prove a loss.

Another object is to avoid the use of another vessel, such as a colander or strainer, into which the entire contents of the cooking pot, both liquid and solids would have to be poured, in order to strain the liquid from the solids, in which operation the danger of scalding the hands is always present unless extraordinary care is taken to avoid such a contingency.

Another object is that said cooking pot cover can be placed on a pot filled with boiling contents and same will not boil out over the pot or stove if the small hinged cover be raised slightly.

All these objects are attained by construction shown in accompanying drawing of which—

Figure 1 is a top view of cooking pot cover when closed, this view also showing position of handle E, and catch "C" on hinged part of cover, position of hinge F, and corrugations or stiffeners "L" used for purpose of stiffening the cover and making it more rigid. Fig. 2 is a cross section of cover on line 2—2 as shown by arrows on Fig. 1. Fig. 2 shows position of wire screen under hinged cover. Fig. 3 is cross section of the cover, with hinged part raised, showing manner of operation, position of cover on pot, and operation of automatic catch on hinged part. Fig. 4 shows a fragment of wire screen under hinged cover from the bottom side. It also shows manner of fastening such wire screen into the stationary part of cover, and also shows tin guard J on wire screen to inclose the rough edge of wire.

Similar letters indicate corresponding parts throughout the several views.

A is stationary part of cover and is to be made of tin, aluminum or other like material, with rolled edge.

B is hinged part of cover to be made of same material as stationary part of cover A with same rolled edge and hinged to A by hinge F as shown in Figs. 1 and 2.

C is catch on hinged part "B" made as outlined in Fig. 2 and fastened to part "B" by rivets or other means of fastening same securely. It is shaped as it is to give necessary spring and tension to automatically catch and hold securely on rounded point D on handle E when hinged part B is raised as shown in Fig. 3 and is fastened to hinged part B at a sufficient distance from edge to allow it to catch on point D when cover B is raised.

D is rounded point on top of handle E for purpose of holding catch C securely when hinged part B is raised as shown in Fig. 3.

E is handle of stationary cover A with rounded edges, and is fastened to cover A by rivets or other means of fastening securely. It is shaped in manner shown in Fig. 3 to enable proper grip being made on same by hands, and being fastened to cover A in manner shown in Figs. 1 and 3 enables such handle and tin guard J, shown in Fig. 4, to be fastened with one set of rivets or other means used for fastening same. The rounded point D to hold securely catch C, Fig. 3, is formed by shaping handle as shown in said Fig. 3.

F is hinge fastening hinged part B to stationary part A and is made by rolling the edges of part A and B, where they come together, over a wire, as is usual and customary in making a hinge of that kind.

G is wire screen, made of wire of the kind customary in wire screens, of a small enough mesh to prevent the passing through of food stuff the size of peas, beans, lentils etc. and still large enough to allow the free passage of the water or liquid contents of cooking pot when cover is used to strain out such water or liquid and retain the balance of the contents in cooking pot. The screen "G" has a tin guard J over the rough edge fastened to stationary part of cover A and such guard J is fastened to stationary part of cover A by same rivets or other fastenings used to fasten handle E to stationary part of cover A. The round edge of wire screen is rolled over a wire H, so as to leave no points open or sticking out and such wire is continued on past the wire screen into the rolled edge of the stationary part A, at both ends as shown in Fig. 4 such rolled edge being left open sufficiently to admit such wire. Such wire is to be inserted far enough into both sides of rolled edge as to make the wire screen perfectly rigid and actually a part of the stationary part A when hinged part "B" is raised. The fastening of tin guard J as outlined before makes it still more rigid and firm.

H is wire over which the round edge of wire screen G is rolled.

J shows the tin guard to protect the rough edge of wire screen and Fig. 3 shows manner of fastening handle E, stationary part of cover A and tin guard J together to get the necessary rigidness.

L shows corrugation on stationary part of cover A and also hinged part of cover B. Its purpose is to stiffen and make rigid both such parts of the cover.

In operation the hinged part of cover B is raised and catch C automatically catches over point D which holds said hinged cover firmly open without any further attention. The handle E is then firmly grasped and entire cover held firmly on pot and pot then turned over to sufficient angle to pour off the water or other liquid contents through wire screen "G" while solid contents will remain in pot and by setting pot aside with hinge part B left open will allow the evaporation of steam necessary to dry off the contents of such pot then remaining. The hinge cover B when opened and caught as outlined acts as a positive guard against the steaming or scalding of the hand holding the handle E.

When used during cooking process, if pot boils over, simply slightly raising and leaving raised the hinged part B will stop the trouble at once.

In washing a knife blade can be run between tin guard J and stationary part of cover A, to remove any trace of cooking, making it sanitary.

I claim as my invention and desire to secure by Letters Patent:

1. A pot cover including two sheet material sections arranged substantially in the same plane and hinged together, one section having a handle upstanding thereon and the other section having a spring catch rigidly secured thereto, said handle having means adapted to engage with the catch on elevating one section out of said plane and thereupon to hold said section elevated.

2. A pot cover including a divided disk of sheet material having its parts hinged together, an upstanding handle attached to one part and arranged approximately perpendicular to the hinge axis and having a locking shoulder, and a spring catch rigidly secured thereto upstanding from the other part and adapted to spring into locking engagement with said shoulder on elevating said other part.

3. A pot cover including a sheet metal part, another part of sheet material having one edge joined to an edge of the first part, said first part having tubular edge-portions in angular relation to its first named edge, and a wire having its ends entered into and thus supported by said tubular edge portions and its intermediate portion supporting the second named part outwardly of its said edge.

4. A pot cover including a sheet metal part, a foraminous part of sheet metal extending from and having one edge thereof underlapping an edge of the first named part, a reinforcing strip extending lengthwise of said edges and against the under face of the second-named part, a handle upstanding from the upper face of the first-named part, and means, extending through the handle, said parts and the strip, to secure all of them together.

In testimony that I claim the foregoing, I hereunto set my hand this 11th day of February 1916.

KITTIE M. KOOPMANN.

Witnesses:
J. NELSON CARLOCK,
BERTIE VICTOR STRONG.